US010218517B2

(12) United States Patent
Mai et al.

(10) Patent No.: US 10,218,517 B2
(45) Date of Patent: Feb. 26, 2019

(54) METHODS FOR GENERATING RELIABLE RESPONSES IN PHYSICAL UNCLONABLE FUNCTIONS (PUFS) AND METHODS FOR DESIGNING STRONG PUFS

(71) Applicant: CARNEGIE MELLON UNIVERSITY, Pittsburgh, PA (US)

(72) Inventors: Kenneth Wei-An Mai, Pittsburgh, PA (US); Mudit Bhargava, Austin, TX (US)

(73) Assignee: Carnegie Mellon University, Pittsburgh, PA (US)

(*) Notice: Subject to any disclaimer, the term of this patent is extended or adjusted under 35 U.S.C. 154(b) by 204 days.

(21) Appl. No.: 15/128,693

(22) PCT Filed: Mar. 25, 2015

(86) PCT No.: PCT/US2015/022478
§ 371 (c)(1),
(2) Date: Sep. 23, 2016

(87) PCT Pub. No.: WO2015/148659
PCT Pub. Date: Oct. 1, 2015

(65) Prior Publication Data
US 2017/0180140 A1   Jun. 22, 2017

Related U.S. Application Data

(60) Provisional application No. 61/967,728, filed on Mar. 25, 2014.

(51) Int. Cl.
H04L 9/00      (2006.01)
H04L 9/32      (2006.01)
(Continued)

(52) U.S. Cl.
CPC .......... H04L 9/3278 (2013.01); G06F 21/72 (2013.01); G06F 21/73 (2013.01)

(58) Field of Classification Search
CPC ..................................................... H04L 9/3278
(Continued)

(56) References Cited

U.S. PATENT DOCUMENTS

2011/0317829 A1* 12/2011 Ficke .................... H04L 9/3278
                                                                380/46
2012/0020145 A1   1/2012 Huber et al.
(Continued)

FOREIGN PATENT DOCUMENTS

WO   WO 2013-083415    *   6/2013
WO   WO2013/083415         6/2013
(Continued)

OTHER PUBLICATIONS

International Search Report and Written Opinion dated Jun. 26, 2015 for International Application No. PCT/US2015/022478 (17 pgs.).
(Continued)

Primary Examiner — Longbit Chai
(74) Attorney, Agent, or Firm — Fish & Richardson P.C.

(57) ABSTRACT

In some aspects, a method includes obtaining, by a response generator circuit, reliability information for each bit of an array of bits provided by a physical unclonable function (PUF) circuit; receiving, from the PUF circuit during run time, an array of values for the array of bits; selecting a plurality of values from the array of values received from the PUF circuit in accordance with the reliability information; and generating, by the response generator circuit, a PUF response from the selected plurality of values.

24 Claims, 3 Drawing Sheets

(51) Int. Cl.
  *G06F 21/73* (2013.01)
  *G06F 21/72* (2013.01)
(58) Field of Classification Search
  USPC .......................................................... 713/189
  See application file for complete search history.

(56) References Cited

U.S. PATENT DOCUMENTS

| | | | |
|---|---|---|---|
| 2013/0133031 A1* | 5/2013 | Fainstein | G06F 21/44 726/2 |
| 2013/0142329 A1 | 6/2013 | Bell et al. | |
| 2013/0234771 A1 | 9/2013 | Simons et al. | |

FOREIGN PATENT DOCUMENTS

| | | |
|---|---|---|
| WO | WO2013/101085 | 7/2013 |
| WO | WO2015/148659 | 10/2015 |

OTHER PUBLICATIONS

Intrinsic-id: Products webpage: www.intrinsic-id.com/products.
NXP, Inc.: Press release (Feb. 21, 2013): http://www.nxp.com/news/press-releases/2013/02/nxp-strengthens-smartmx2-security-chips-with-puf-anti-cloning-technology.html.
Verayo, Inc. Products webpage: www.verayo.com/products.
K. Agarwal and S. Nassif, "Characterizing Process Variation in Nanorneter CMOS," Proceedings of 44th ACM/IEEE Design Automation Conference DAC'07, pp. 396-399, 2007.
M. Bhargava et al., "Attack resistant sense amplifier based PUFs (SA-PUF) with deterministic and controllable reliability of PUF responses," Proceedings of IEEE Int Hardware-Oriented Security and Trust (HOST) Symp, 2010.
M. Bhargava et al., "Reliability enhancement of bi-stable PUFs in 65nm bulk CMOS," Hardware-Oriented Security and Trust (HOST), 2012 IEEE International Symposium, pp. 25-30 (2012).
Christoph Bosch et al., "Efficient Helper Data Key Extractor on FPGAs," Cryptographic Hardware and Embedded Systems a CHES 2008, vol. 5154, pp. 181-197 (2008).
Yevgeniy Dodis et al., "Fuzzy extractors: How to generate strong keys from biometrics and other noisy data," Advances in Cryptology—EUROCRYPT 2004, vol. 3027, pp. 523-540 (2004).
Blaise Gassend et al., "Silicon physical random functions," CCS '02: Proceedings of the $9^{th}$ ACM conference on Computer and communications security, pp. 148-160 (2002).
Blaise Gassend et al., "Identification and authentication of integrated circuits," Concurrency and Computation: Practice and Experience, 16(11):1077-1098 (2004).
J. Guarjardo et al., Physical Unclonable Functions and Public-Key Crypto for FPGA IP Protection, Proceedings of Int. Conference Field Programmable Logic and Applications FPL 2007, pp. 189-195 (2007).
Jorge Guajardo et al., "Anti-counterfeiting, key distribution, and key storage in an ambient world via physical unclonable functions," Information Systems Frontiers, 11:19-41, 2009.
Jorge Guajardo et al., "FPGA Intrinisic PUFs and Their Use for IP Protection," Proceedings of the $9^{th}$ international workshop on Cryptographic Hardware and Embedded Systems, CHES '07, pp. 63-80 (2007).
Ghaith Hammouri et al., "Unclonable lightweight authentication scheme," Information and Communications Security, vol. 5308, pp. 33-48 (2008).
D.E. Holcomb et al., "Power-Up SRAM State as an Identifying Fingerprint and Source of True Random Numbers," IEEE Trans. Comput. 58(9):1198-1210 (2009).
R.W. Keyes, "Effect of randomness in the distribution of impurity ions on FET thresholds in integrated electronics," IEEE J. Solid-State Circuits, 10(4):245-247 (1975).
Patrick Koeberl et al., "Evaluation of a PUF Device Authentication Scheme on a Discrete 0.13 umSRAM," (2012).
J. W. Lee et al., "A technique to build a secret key in integrated circuits for identification and authentication applications," Proceedings of Digest of Technical Papers VLSI Circuits 2004 Symp, pp. 176-179,2004.
Vincent Leest et al., "Soft Decision Error Correction for Compact Memory-Based PUFs Using a Single Enrollment," Cryptographic Hardware and Embedded Systems a CHES 2012, vol. 7428, pp. 268-282 (2012).
Daihyun Lim et al., Extracting secret keys from integrated circuits. IEEE Trans. VLSI Syst., 13(10):1200-1205, 2005.
R. Maes et al., "Experimental evaluation of Physically Unclonable Functions in 65 nm CMOS," ESSCIRC (ESSCIRC), 2012 Proceedings of the, pp. 486 489, Sep. 2012.
Roel Maes et al., "PUFKY: A Fully Functional PUF-Based Cryptographic Key Generator," CHES, pp. 302-319 (2012).
Ken Mai, "Introduction to hardware security and trust," SpringerLink: Bucher, chapter Side Channel Attacks and Countermeasures, (2012).
P. Oldiges et al., "Modeling line edge roughness effects in sub 100 nanometer gate length devices," Proceedings of Int. Conference Simulation of Semiconductor Processes and Devices SISPAD, pp. 131-134 (2000).
M.J.M. Pelgrom et al., "Matching properties of MOS transistors," IEEE J. Solid-State Circuits, 24(5):1433-1439 (1989).
Ulrich Ruhrmair et al., "Strong PUFs: Models, Constructions, and Security Proofs," Towards Hardware-Intrinsic Security, pp. 79-96 (2010).
B. Skoric et al., "Robust Key Extraction from Physical Uncloneable Functions," Applied Cryptography and Network Security, vol. 3531, pp. 407-422 (2005).
G.E. Suh and S. Devadas, "Physical Unclonable Functions for Device Authentication and Secret Key Generation," Proceedings of $44^{th}$ ACM / IEEE Design Automation Conference DAC '07, pp. 9-14 (2007).
Meng-Day Yu and S. Devadas, "Secure and Robust Error Correction for Physical Unclonable Functions," IEEE Design & Test of Computers, 27(1):48-65 (2010).
Meng-Day Mandel Yu et al., "Lightweight and secure PUF key storage using limits of machine learning," Proceedings of the $13^{th}$ international conference on Cryptographic hardware and embedded systems, CHES'11, pp. 358-373 (2011).

* cited by examiner

METHODS FOR GENERATING RELIABLE RESPONSES IN PHYSICAL UNCLONABLE FUNCTIONS (PUFS) AND METHODS FOR DESIGNING STRONG PUFS

CROSS REFERENCE TO RELATED APPLICATIONS

This application is a § 371 National Stage Application of PCT/US2015/022478, filed Mar. 25, 2015, which, in turn, claims the benefit of priority under 35 U.S.C. § 119(e) to provisional U.S. Patent Application No. 61/967,728, filed Mar. 25, 2014, the entire contents of which are hereby incorporated by reference.

STATEMENT REGARDING FEDERALLY SPONSORED RESEARCH AND DEVELOPMENT

This invention was made with partial government support under the National Science Foundation Grant Number CNS1117755. The government has certain rights to this invention.

FIELD OF USE

The present disclosure relates to physical unclonable functions (PUFs).

BACKGROUND

A physical unclonable function (PUF) is a silicon die-specific random function or a silicon biometric that is unique for every instance of the die. In general, PUFs derive their randomness from uncontrolled random variations in the integrated circuit fabrication process (usually undesirable) to create practically unclonable functions even if the original design files are compromised. PUFs can be used as building blocks in many secure systems for applications such as device identification/authentication and secret key generation. PUFs can be an alternative to storing of random secret bits in volatile or non-volatile memory (which may be vulnerable to attacks) by instead generating these random bits every time the PUFs are activated.

PUF implementations generate random bits by amplifying some electrical characteristic (e.g., delay or threshold voltage) from two nominally identical circuit components in the PUF array. These electrical differences, especially when small, often flip polarity across environmental variations (e.g., voltage and temperature), in the presence of ambient noise, or over device aging, resulting in some bits of the raw PUF response being inconsistent/unreliable. For some designs, greater than 25% of the PUF response bits may be unreliable across environmental variations. Because electrical differences of larger magnitude require larger variations to flip polarity, a PUF bit may be more reliable when generated by amplifying a larger electrical difference.

Although some applications, such as identification and authentication, can be designed to tolerate a few errors in the response without significant loss of security, all applications can benefit from more reliable PUFs, and applications such as key generation may require the PUF response to be perfectly reliable.

SUMMARY

The present disclosure describes methods and systems related to physical unclonable function (PUF) circuits, which can be used on integrated circuits for device identification/authentication and secret key generation. In one aspect, a method includes obtaining, by a response generator circuit, reliability information for each bit of an array of bits provided by a physical unclonable function (PUF) circuit; receiving, from the PUF circuit during run time, an array of values for the array of bits; selecting a plurality of values from the array of values received from the PUF circuit in accordance with the reliability information; and generating, by the response generator circuit, a PUF response from the selected plurality of values.

Implementations of the disclosure can include one or more of the following features. The PUF circuit includes an array of circuits, with each circuit of the array of circuits providing a bit of the array of bits, and the method can include receiving, from the array of circuits, the array of values for the array of bits. The response generator circuit can include a built-in self-test (BIST) circuit, and the method can include generating, by the BIST circuit, the reliability information for each bit of the array of bits. The response generator circuit can include a non-volatile memory, and the method can include storing the reliability information in the non-volatile memory. Generating, by the BIST circuit, the reliability information for each bit of the array of bits can include receiving first values for the array of bits generated by the PUF circuit in response to receiving a positive differential input voltage; receiving second values for the array of bits generated by the PUF circuit in response to receiving a negative differential input voltage; comparing the first values to the second values; and generating a reliability bitmap indicating bits of the array where the first values match the second values. Selecting the plurality of values from the array of values received from the PUF circuit in accordance with the reliability information can include selecting, as a plurality of reliable bits, at least a portion of the bits of the array where the first values match the second values as indicated by the reliability bitmap. Selecting, as the plurality of reliable bits, at least the portion of the bits of the array where the first values match the second values as indicated by the reliability bitmap can include selecting the plurality of reliable bits after the PUF circuit receives a zero or near zero differential input voltage. The method can include transmitting the PUF response to a cryptographic system for use as at least a portion of a cryptographic key.

In another aspect, a device includes a physical unclonable function (PUF) circuit configured to provide an array of bits and to generate an array of values for the array of bits during run time; and a bit aggregator circuit configured to obtain reliability information for each bit of the array of bits, to select a plurality of values from the array of values generated by the PUF circuit during run time in accordance with the reliability information, and to generate a PUF response from the selected plurality of values.

Implementations of the disclosure can include one or more of the following features. The PUF circuit can include an array of sense amplifier (SA) circuits, an array of flip-flop circuits, an array of latch circuits, an array of static random access memory (SRAM) cells, an array of bi-stable circuits, or an array of digital bi-stable circuits. The device can include a non-volatile memory configured to store the reliability information. The device can include a built-in self-test (BIST) circuit configured to generate the reliability information for each bit of the array of bits. The BIST circuit can be further configured to receive first values for the array of bits generated by the PUF circuit in response to receiving a positive differential input voltage; receive second values for the array of bits generated by the PUF circuit in response to receiving a negative differential input voltage; compare the first values to the second values; and generate a reliability bitmap indicating bits of the array of bits where the first values match the second values. The bit aggregator circuit can be further configured to select, as a plurality of reliable bits, at least a portion of the bits of the array where the first values match the second values as indicated by the reliability bitmap. The bit aggregator circuit can be further configured to select the plurality of reliable bits after the PUF circuit receives a zero or near zero differential input voltage. The bit aggregator circuit can be further configured to transmit the PUF response to a cryptographic system for use as at least a portion of a cryptographic key.

In yet another aspect, a system includes a cryptographic system and a response generator circuit. The cryptographic system is configured to receive a cryptographic key. The response generator circuit includes a physical unclonable function (PUF) circuit configured to provide an array of bits and to generate an array of values for the array of bits in response during run time, and a bit aggregator circuit configured to obtain reliability information for each bit of the array of bits, to select a plurality of values from the array of values generated by the PUF circuit in accordance with the reliability information, to generate a PUF response from the selected plurality of values, and to transmit the PUF response to the cryptographic system for use as at least a portion of the cryptographic key.

Implementations of the disclosure can include one or more of the following features. The PUF circuit can include an array of sense amplifier (SA) circuits, an array of flip-flop circuits, an array of latch circuits, an array of static random access memory (SRAM) cells, an array of bi-stable circuits, or an array of digital bi-stable circuits. The system can include a non-volatile memory configured to store the reliability information. The response generator circuit can include a built-in self-test (BIST) circuit configured to generate the reliability information for each bit of the array of bits. The BIST circuit can be further configured to receive first values for the array of bits generated by the PUF circuit in response to receiving a positive differential input voltage; receive second values for the array of bits generated by the PUF circuit in response to receiving a negative differential input voltage; compare the first values to the second values; and generate a reliability bitmap indicating bits of the array of bits where the first values match the second values. The bit aggregator circuit can be further configured to select, as a plurality of reliable bits, at least a portion of the bits of the array where the first values match the second values as indicated by the reliability bitmap. The bit aggregator circuit can be further configured to select the plurality of reliable bits after the PUF circuit receives a zero or near zero differential input voltage. The cryptographic system can be further configured to receive a challenge and to provide a cryptographic response.

The details of one or more implementations are set forth in the accompanying drawings and the description below. While specific implementations are described, other implementations exist that include operations and components different than those illustrated and described below. Other features, objects, and advantages will be apparent from the description, the drawings, and the claims.

DETAILED DESCRIPTION

Figure 1:
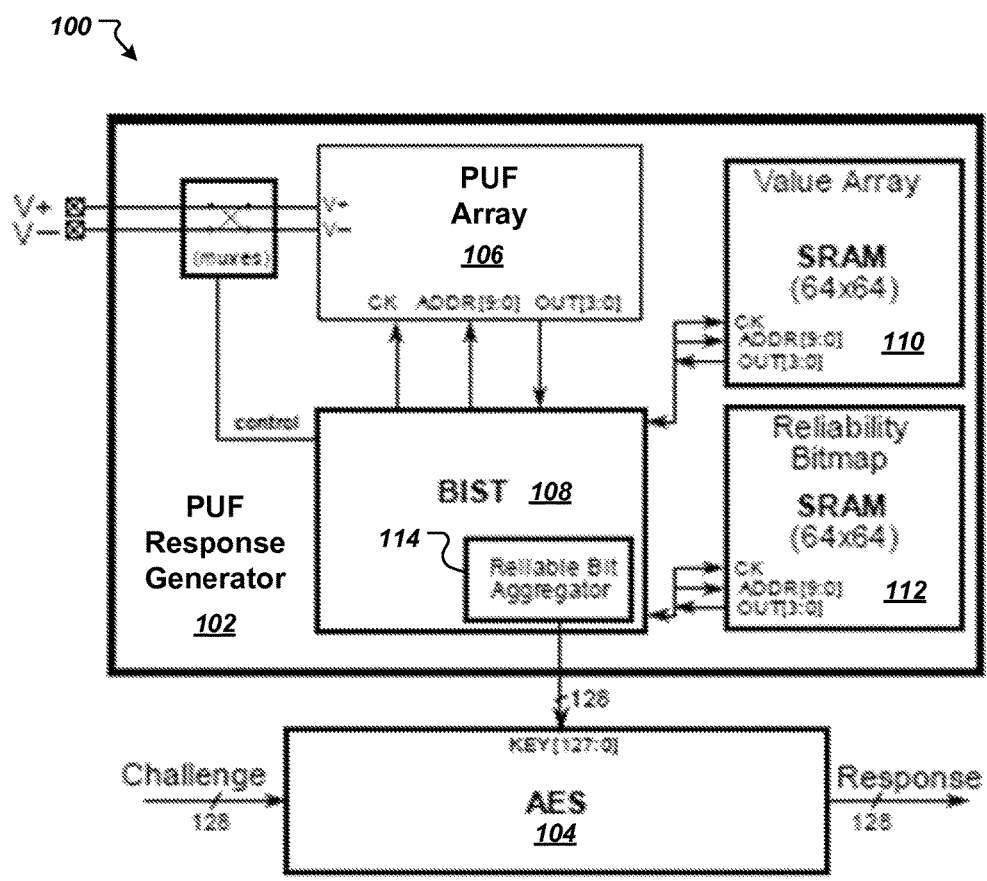
FIG. 1 is a block diagram of an example system for secret key generation using a PUF response.

The techniques described in the present disclosure can be used in applications such as device identification/authentication and secret key generation. Although the techniques described in the present disclosure are applicable to a wide range of applications, various implementations will be described in the context of secret key generation using an advanced encryption standard (AES) system. FIG. 1 is a block diagram of an example system 100 for secret key generation. The system 100 includes a physical unclonable function (PUF) response generator 102 and an advanced encryption standard (AES) cryptographic primitive 104. The PUF response generator circuit 102 includes a PUF array 106, built-in self-test (BIST) logic 108, and two 64×64 static random access memory (SRAM) arrays 110 and 112. The system 100 can be fabricated on an integrated circuit chip.

The PUF array 106 can include an array of sense amplifier (SA) circuits, an array of flip-flop circuits, an array of latch circuits, an array of static random access memory (SRAM) cells, an array of bi-stable circuits, or an array of digital bi-stable circuits. As shown in FIG. 1, the PUF array 106 is a sense amplifier (SA) based PUF array that includes a 64×64 SA PUF array. The SA PUF array is configured similar to a typical SRAM array, and each row of the SA PUF array is activated by a rising sense enable (SE) signal which is implemented similar to the word-line (WL) signal in a SRAM array.

Figure 2:
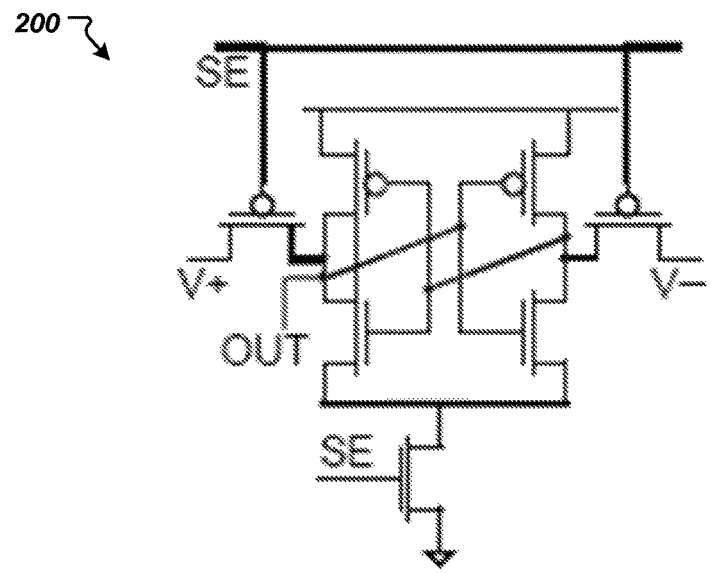
FIG. 2 is a schematic of an example of a sense amplifier (SA) that can be used in a PUF.

FIG. 2 is a schematic of an example of a sense amplifier (SA) 200 that can be used in the PUF array 106. The SA 200 is a latch-style SA with a bi-stable portion in the center. SAs are clocked circuits that amplify small differential voltages into full swing digital values and are can be used in memory read paths and as voltage comparators. Under ideal conditions, an ideal SA would correctly amplify even the smallest of input differential voltages. In practice, however, variations in the devices of an SA may result in an offset (or bias), which is a measure of the natural tendency of the SA to resolve to a particular polarity. In typical SA implementations, correct operation is ensured by providing the SA inputs V+ and V− with a voltage difference larger than the offset voltage ($|V_{OFFSET}|$). Offset of a SA results from a combination of systematic and random variations. Systematic variations can be due to manufacturing gradients and layout asymmetries, and can be minimized by symmetric layout of matched devices. Random variations are a result of random uncertainties in the fabrication process such as random dopant fluctuation (fluctuations in the number and location of dopants in the transistor channel) and gate line-edge roughness. The effects can be mitigated by using larger devices.

SAs can be used as PUFs by evaluating them while providing a zero differential input voltage at inputs V+ and V−. To maximize randomness and reliability, SAs as PUF arrays should be built using a regular layout and by using small-sized devices. A regular layout will minimize any systematic variations (high randomness) and small-sized devices will maximize the variations in the device characteristics (high reliability). Hardware measurements have previously shown that SA PUFs designed this way have good randomness and uniqueness characteristics.

The magnitude of the offset voltage ($|V_{OFFSET}|$) of a SA is a good indicator of its reliability for use in a PUF. A SA with high $|V_{OFFSET}|$ (i.e., a strong bias to resolve to a particular polarity) will likely resolve to the same polarity across environmental variations and over aging. Measured hardware results have shown high reliability from SA PUFs with $|V_{OFFSET}|>50$ mV.

Figures 3, 6:
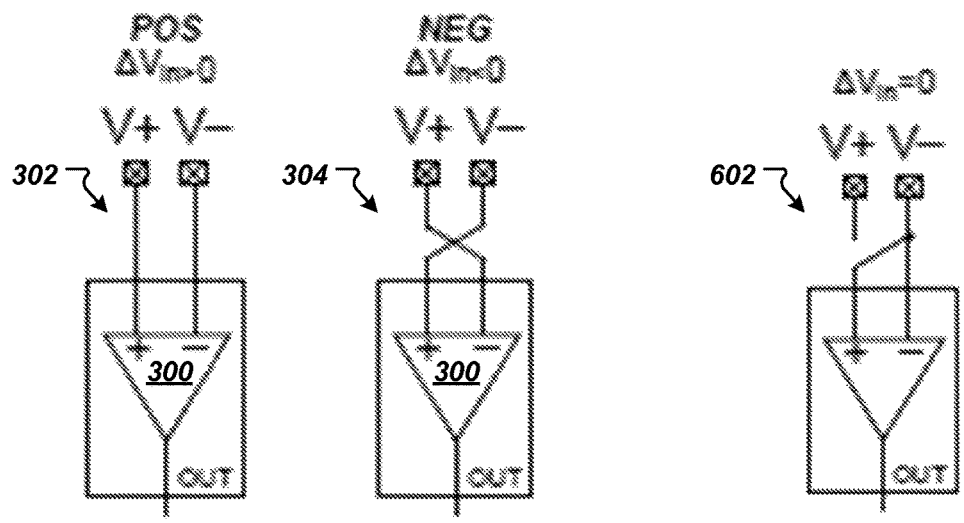
FIG. 3 shows examples of schematics for enrollment operation of an SA.
FIG. 6 shows an example of a schematic for run-time operation of an SA.

FIG. 3 shows examples of schematics 302 and 304 for enrollment operation of an SA 300. A two-phase enrollment operation is used to characterize the reliability of the PUF array 106. If a large number of SAs are arrayed with their inputs shorted across all of them (i.e., a common V+ and a common V−), then the entire array of SAs can be characterized together. In the first phase (POS phase), the inputs are configured such that $\Delta V_{IN}=(V+)-(V-)$, as shown in schematic 302. In the second phase (NEG phase), the connections are reversed so $\Delta V_{IN}=(V-)-(V+)$, as shown in the schematic 304. At the end of enrollment, a SA is selected as a potentially reliable one if the value at the output OUT of the SA is consistent (either 1 or 0) for both the phases, as shown in Table 1 below.

TABLE 1

| OUT (POS) | OUT (NEG) | DECISION |
| --- | --- | --- |
| 1 | 1 | SELECT (strong '1' bias) |
| 0 | 0 | SELECT (strong '0' bias) |
| 1 | 0 | REJECT (small bias) |

A consistent output of a SA is an indicator that its $|V_{OFFSET}|>\Delta N_{IN}$ (i.e., an external $\Delta V_{IN}$ was insufficient to make a SA flip its preferred polarity) and hence the SA has a high probability to resolve to a consistent polarity when $\Delta V_{IN}=0$ across different and noisy environmental conditions. V+ and V− are kept fixed at a voltage differential ($\Delta V_{IN}$) that provides sufficient robustness over environmental variations. A higher $\Delta V_{IN}$ during enrollment operation will result in a smaller set of selected SAs, but one with higher expected reliability. Hence, reliability will be a function of the chosen $\Delta V_{IN}$. Previous studies have shown that a $\Delta V_{IN}$ of approximately 50 mV results in selection of approximately 50% of SAs which have extremely high reliability, but this can vary with SA design and process technology.

Referring again to FIG. 1, BIST logic 108 can be used to pre-characterize and selectively use only the reliable bits of the PUF array 106. The BIST logic 108 generates a reliability bitmap during the two-phase enrollment operation. The reliability bitmap is then used at run-time to select reliable bits from the PUF array 106. The selected reliable bits are used to generate a PUF response. The first 128 of these bits can be used as a cryptographic key in the AES primitive 104 to realize a reliable and secure "strong" PUF. The input and output of the AES primitive 104 are treated as the challenge and response respectively.

Figure 4:
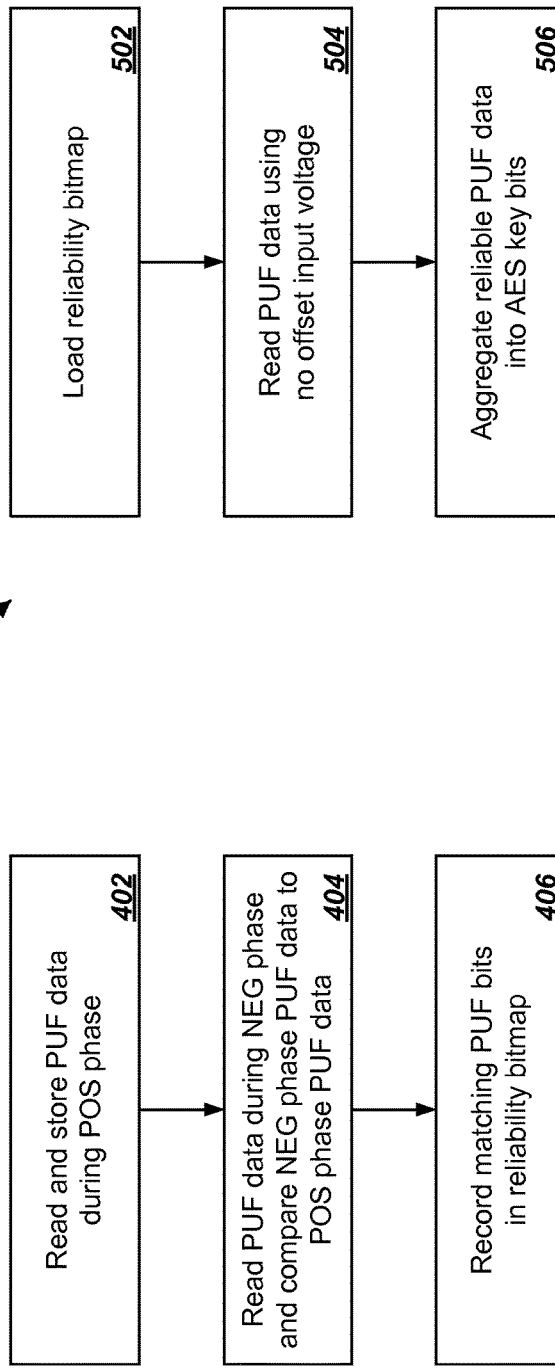
FIG. 4 is a flowchart of an example of a process performed during a two-phase enrollment operation.

FIG. 4 is a flowchart of an example of a process 400 performed by the BIST logic 108 during a two-phase enrollment operation. During the first phase (POS phase) of enrollment (pre-characterization), the values from the PUF array 106 are read and temporarily stored in the Value Array SRAM 110 (402). In the second phase (NEG phase), the values from the PUF array 106 are read, and the NEG phase values are compared with the POS phase values by, e.g., simultaneously accessing the Value Array SRAM 110 (404). If the POS phase value equals the NEG phase value for a SA, this suggests that its $|V_{OFFSET}|>\Delta V_{IN}$, and its location is marked as potentially reliable by storing a '1' at the corresponding location in the Reliability Bitmap SRAM array 112 (406). The written word into the Reliability Bitmap is generated by a bit-wise XNOR of the POS phase value and the NEG phase value. The end product of enrollment is the completely filled Reliability Bitmap SRAM array 112. This reliability bitmap can be stored in a non-volatile memory of the PUF response generator 102 or can be sent to the PUF response generator 102 from an external server before it needs to generate its response in the field.

Figure 5:
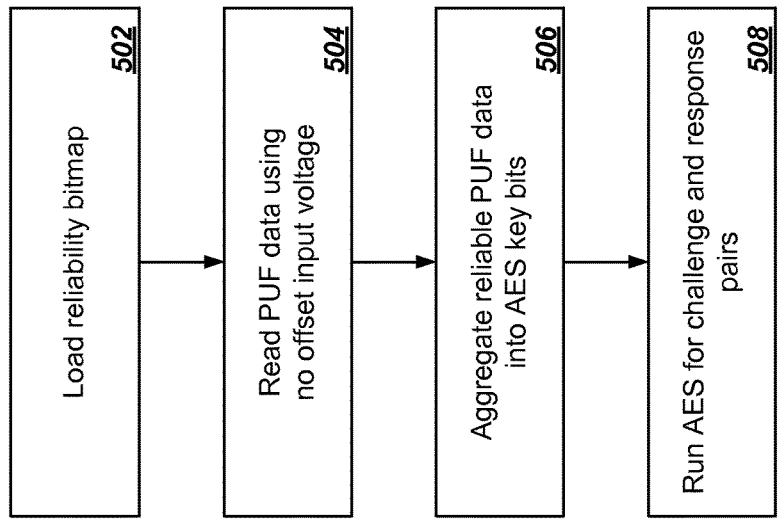
FIG. 5 is a flowchart of an example of a process performed during run-time operation to generate a PUF response.

FIG. 5 is a flowchart of an example of a process 500 performed by the BIST logic 108 during run-time operation when the PUF response generator 102 is used in the field. The reliability information is loaded into the Reliability Bitmap SRAM array 112 (502). The PUF array 106 is activated with $\Delta V_{IN}=0$ (504), as shown in the schematic 602 of FIG. 6. The corresponding reliability information is read from the Reliability Bitmap SRAM array 112. A Reliable Bit Aggregator 114 aggregates the PUF values from the first N reliable locations of the PUF array 106 (as per the Reliability Bitmap) (506) to generate and store a reliable N-bit PUF response in registers (not shown). In some implementations, the Reliable Bit Aggregator 114 in the BIST logic 108 aggregates 512 reliable bits during run-time and generates a PUF response. The first 128 of these bits can be used as a cryptographic key in the AES primitive 104, which is run for challenge and response pairs (508). The 128-bit input and output to the AES primitive 104 can then be considered the challenge-response pair (CRP) of the strong-PUF.

A strong PUF is defined as a PUF with extremely large number of challenge-response pairs. Most PUF implementations (including ROs, SRAM, SAs) only generate a small number of random bits. Designing a true strong PUF may be challenging and may possibly be impractical for most applications. The one-way property of AES, a standard one-way encryption primitive which is widely used and considered extremely secure, is leveraged to design a practical strong PUF. The PUF response bits used are unique across chips, and hence the responses of the PUF will be unique across chips. The use of reliable cryptographic keys makes an AES primitive a deterministic function and ensures that the responses from a PUF are repeatable (and hence reliable) for the same challenge bits.

The reliability bitmap carries no information about polarity of the bits but only the physical location of the potentially more reliable bits of the PUF array 106. Hence, the reliability bitmap does not leak any information about the bits unless there is a location-based correlation found in the bits generated from the SAs in the PUF array 106. However, the biggest contributor of $V_{OFFSET}$ (and hence the polarity of bit) is local random variations in the devices of a SA (e.g., random dopant fluctuations and line edge roughness), and hence the bits of the array can be assumed to largely independent.

The enrollment needs to be done just once to extract the reliability bitmap of the PUF array 106. In some implementations, the enrollment is a completely self-contained operation and requires no configuration except fixing the two signal pins V+ and V− to provide a sufficient $\Delta V_{IN}$ which could be done with an internal resistive ladder or other bias generator circuits. Enrollment requires reading all locations of the PUF array 106 twice, one each for the POS phase and the NEG phase with a break between the phases to allow the inputs of the SAs to settle to the switched voltages. A design that uses 4-bit words requires 1024 cycles for each phase. From the simulations of the design with parasitic capacitances extracted, the SA inputs are estimated to take less than 250 ns to settle. At 250 MHz, enrollment would take approximately 8.5 µs. At 10 MHz, enrollment would take approximately 205 µs. The speed of enrollment could be further increased by increasing the word size of the SA and the SRAM arrays from 4, but at the cost of increased I/O pins since this reliability information has to be sent off chip for storage.

At run-time, the PUF response generator 102 loads the reliability bitmap (generated during enrollment and stored off-chip) into the Reliability Bitmap SRAM array 112. The PUF array 106 is evaluated while the Reliable Bit Aggregator 114 accumulates the reliable bits of the PUF response by processing the output words from the PUF array 106 and the Reliability Bitmap SRAM array 112, one word at a time. For 4-bit word designs, this run-time PUF response generation operation takes a maximum of 2048 cycles—1024 cycles to load the Reliability Bitmap, and 1024 cycles to aggregate the PUF response bits. To aggregate 171 bits, it would require nominally accessing 570 of the 4096 bits (or 143 cycles instead of 1024). At a speed of 250 MHz, run-time PUF response generation would take approximately 1.15 µs. At a speed of 10 MHz, it would take approximately 28.6 µs.

In some implementations, the PUF response could be generated by storing approximately 570 bits of reliability bitmap. This is a significant improvement over the typical requirement of many thousands of bits of helper data in conventional PUFs that use error correcting code (ECC). For example, in PUFs using ECC, to generate a 128-bit PUF response with a targeted response error rate less than $10^{-6}$ would typically require 3,000 to 10,000 PUF raw response bits (with bit error rate of 15%) to generate a response. This is equivalent to using 23 to 80 raw bits to generate a single reliable bit. The helper data generated for this case would then be 3,000 to 15,000 bits. Further, the reliability bitmap is significantly more resilient to information leakage as compared to the helper data in conventional ECC.

Other examples are within the scope and spirit of the description and claims. Additionally, certain functions described above can be implemented using software, hardware, firmware, hardwiring, or combinations of any of these. Features implementing functions may also be physically located at various positions, including being distributed such that portions of functions are implemented at different physical locations. The use of the term "a" herein and throughout the application is not used in a limiting manner and therefore is not meant to exclude a multiple meaning or a "one or more" meaning for the term "a." Additionally, to the extent priority is claimed to a provisional patent application, it should be understood that the provisional patent application is not limiting but includes examples of how the techniques described herein may be implemented.

It will thus be seen that the objects set forth above, among those made apparent from the preceding description, are efficiently attained and, because certain changes may be made in carrying out the above method and in the construction(s) set forth without departing from the spirit and scope of the disclosure, it is intended that all matter contained in the above description and shown in the accompanying drawings shall be interpreted as illustrative and not in a limiting sense.

A number of exemplary implementations of the invention have been described. Nevertheless, it will be understood by one of ordinary skill in the art that various modifications may be made without departing from the spirit and scope of the invention.

What is claimed is:

1. A method comprising:
   obtaining, by a response generator circuit, reliability information, specifying, for each bit of an array of bits provided by a physical unclonable function (PUF) circuit, whether a portion of the PUF circuit that provided that bit is configured to provide a consistent output for a plurality of operations of the PUF circuit, wherein the consistent output is an indicator that an external differential input value is insufficient to flip a polarity of a bit of the array across different environment conditions;
   receiving, from the PUF circuit during run time, an array of values for the array of bits;
   selecting a plurality of values from the array of values received from the PUF circuit in accordance with the reliability information; and
   generating, by the response generator circuit, a PUF response from the selected plurality of values if the provided output is consistent throughout a measurement process.

2. The method of claim 1, wherein the PUF circuit comprises an array of circuits, with each circuit of the array of circuits providing a bit of the array of bits, and the method further comprises:
   receiving, from the array of circuits, the array of values for the array of bits.

3. The method of claim 1, wherein the response generator circuit comprises a built-in self-test (BIST) circuit, and the method further comprises:
   generating, by the BIST circuit, the reliability information for each bit of the array of bits.

4. The method of claim 3, wherein the response generator circuit comprises a non-volatile memory, and the method further comprises:
   storing the reliability information in the non-volatile memory.

5. The method of claim 3, wherein generating, by the BIST circuit, the reliability information for each bit of the array of bits comprises:
   receiving first values for the array of bits generated by the PUF circuit in response to receiving a positive differential input voltage;
   receiving second values for the array of bits generated by the PUF circuit in response to receiving a negative differential input voltage;
   comparing the first values to the second values; and
   generating a reliability bitmap indicating bits of the array where the first values match the second values.

6. The method of claim 5, wherein selecting the plurality of values from the array of values received from the PUF circuit in accordance with the reliability information comprises:
   selecting, as a plurality of reliable bits, at least a portion of the bits of the array where the first values match the second values as indicated by the reliability bitmap.

7. The method of claim 6, wherein selecting, as the plurality of reliable bits, at least the portion of the bits of the array where the first values match the second values as indicated by the reliability bitmap comprises:
   selecting the plurality of reliable bits after the PUF circuit receives a zero or near zero differential input voltage.

8. The method of claim 1, further comprising:
transmitting the PUF response to a cryptographic system for use as at least a portion of a cryptographic key.

9. A device comprising:
a physical unclonable function (PUF) circuit configured to provide an array of bits and to generate an array of values for the array of bits during run time; and
a bit aggregator circuit configured to:
obtain reliability information, specifying, for each bit of the array of bits, whether a portion of the PUF circuit that provided that bit is configured to provide a consistent output for a plurality of operations of the PUF circuit, wherein the consistent output is an indicator that an external differential input value is insufficient to flip a polarity of a bit of the array across different environment conditions;
select a plurality of values from the array of values generated by the PUF circuit during run time in accordance with the reliability information; and
generate a PUF response from the selected plurality of values if the provided output is consistent throughout a measurement process.

10. The device of claim 9, wherein the PUF circuit comprises an array of sense amplifier (SA) circuits, an array of flip-flop circuits, an array of latch circuits, an array of static random access memory (SRAM) cells, an array of bi-stable circuits, or an array of digital bi-stable circuits.

11. The device of claim 9, further comprising:
a non-volatile memory configured to store the reliability information.

12. The device of claim 9, further comprising:
a built-in self-test (BIST) circuit configured to generate the reliability information for each bit of the array of bits.

13. The device of claim 12, wherein the BIST circuit is further configured to:
receive first values for the array of bits generated by the PUF circuit in response to receiving a positive differential input voltage;
receive second values for the array of bits generated by the PUF circuit in response to receiving a negative differential input voltage;
compare the first values to the second values; and
generate a reliability bitmap indicating bits of the array of bits where the first values match the second values.

14. The device of claim 13, wherein the bit aggregator circuit is further configured to select, as a plurality of reliable bits, at least a portion of the bits of the array where the first values match the second values as indicated by the reliability bitmap.

15. The device of claim 14, wherein the bit aggregator circuit is further configured to select the plurality of reliable bits after the PUF circuit receives a zero or near zero differential input voltage.

16. The device of claim 9, wherein the bit aggregator circuit is further configured to transmit the PUF response to a cryptographic system for use as at least a portion of a cryptographic key.

17. A system comprising:
a cryptographic system configured to receive a cryptographic key; and
a response generator circuit comprising:
a physical unclonable function (PUF) circuit configured to provide an array of bits and to generate an array of values for the array of bits in response during run time, and
a bit aggregator circuit configured to:
obtain reliability information, specifying, for each bit of the array of bits, whether a portion of the PUF circuit that provided that bit is configured to provide a consistent output for a plurality of operations of the PUF circuit, wherein the consistent output is an indicator that an external differential input value is insufficient to flip a polarity of a bit of the array across different environment conditions;
select a plurality of values from the array of values generated by the PUF circuit in accordance with the reliability information; and
if the provided output is consistent throughout a measurement process, generate a PUF response from the selected plurality of values and transmit the PUF response to the cryptographic system for use as at least a portion of the cryptographic key.

18. The system of claim 17, wherein the PUF circuit comprises an array of sense amplifier (SA) circuits, an array of flip-flop circuits, an array of latch circuits, an array of static random access memory (SRAM) cells, an array of bi-stable circuits, or an array of digital bi-stable circuits.

19. The system of claim 17, further comprising:
a non-volatile memory configured to store the reliability information.

20. The system of claim 17, wherein the response generator circuit further comprises:
a built-in self-test (BIST) circuit configured to generate the reliability information for each bit of the array of bits.

21. The system of claim 20, wherein the BIST circuit is further configured to:
receive first values for the array of bits generated by the PUF circuit in response to receiving a positive differential input voltage;
receive second values for the array of bits generated by the PUF circuit in response to receiving a negative differential input voltage;
compare the first values to the second values; and
generate a reliability bitmap indicating bits of the array of bits where the first values match the second values.

22. The system of claim 21, wherein the bit aggregator circuit is further configured to select, as a plurality of reliable bits, at least a portion of the bits of the array where the first values match the second values as indicated by the reliability bitmap.

23. The system of claim 22, wherein the bit aggregator circuit is further configured to select the plurality of reliable bits after the PUF circuit receives a zero or near zero differential input voltage.

24. The system of claim 17, wherein the cryptographic system is further configured to receive a challenge and to provide a cryptographic response.

* * * * *